US006392545B2

(12) United States Patent
Lake et al.

(10) Patent No.: US 6,392,545 B2
(45) Date of Patent: May 21, 2002

(54) ELECTRICAL APPARATUSES, AND METHODS OF FORMING ELECTRICAL APPARATUSES

(75) Inventors: Rickie C. Lake, Eagle; Mark E. Tuttle, Boise, both of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/733,275

(22) Filed: Dec. 7, 2000

Related U.S. Application Data

(62) Division of application No. 09/384,836, filed on Aug. 27, 1999.

(51) Int. Cl.$^7$ .............................................. G08B 13/14
(52) U.S. Cl. ................. 340/572.8; 340/10.1; 340/573.4; 340/573.1; 340/870.16; 342/51; 43/132.1; 361/600; 361/749; 361/772; 361/784; 361/792; 29/825; 174/52.4; 174/254; 174/259; 428/901
(58) Field of Search ..................... 340/572.8, 10.1, 340/573.1, 573.4, 870.16; 342/51, 50; 43/132.1; 361/772, 784, 792, 761, 749, 600; 428/901; 174/36, 34, 27, 254, 259, 52.4, 52.3; 29/825, 740, 760

(56) References Cited

U.S. PATENT DOCUMENTS

| | | | |
|---|---|---|---|
| 3,778,805 A | 12/1973 | Gould | 340/541 |
| 4,136,338 A | 1/1979 | Antenore | 340/551 |
| 4,455,441 A | 6/1984 | Prestwich | 568/843 |
| 4,737,789 A | 4/1988 | Nysen | 342/51 |
| 4,937,555 A | 6/1990 | Litzkow et al. | 340/540 |
| 4,951,057 A | 8/1990 | Nagel | 342/51 |
| 5,024,832 A | 6/1991 | Omata et al. | 424/84 |
| 5,182,420 A * | 1/1993 | Steitz et al. | 174/52.4 |
| 5,205,032 A * | 4/1993 | Kuroda et al. | 29/740 |
| 5,266,746 A * | 11/1993 | Nishihara et al. | 174/254 |
| 5,274,570 A * | 12/1993 | Izumi et al. | 716/1 |
| 5,329,726 A | 7/1994 | Thorne et al. | 43/124 |
| 5,384,691 A * | 1/1995 | Neugebauer et al. | 361/794 |
| 5,428,345 A | 6/1995 | Bruno | 340/550 |
| 5,459,284 A * | 10/1995 | Bockelman et al. | 174/34 |
| 5,471,010 A * | 11/1995 | Bockelman et al. | 174/36 |

(List continued on next page.)

OTHER PUBLICATIONS

Website: Dow AgroSciences, Sentricon Colony Elimination System:, 1998, 7 pgs. (copy in 09/373,457 file).

*Primary Examiner*—John Tweel
(74) *Attorney, Agent, or Firm*—Wells St. John P.S.

(57) ABSTRACT

The invention encompasses an electrical apparatus. Such apparatus comprises a first substrate having first circuitry thereon. The first circuitry has a terminal extending therefrom, and the terminal defines a first electrical node. The apparatus further comprises a first dielectric material covering a predominate portion of the first circuitry and not covering the first electrical node. Additionally, the apparatus comprises a second substrate having second circuitry thereon. The second circuitry has a terminal extending therefrom, and such terminal defines a second electrical node. A second dielectric material covers a predominate portion of the second circuitry, but does not cover the second electrical node. The second substrate comprises a different material than the first substrate. A portion of the second substrate is over a portion of the first substrate to define an overlap between the first and second substrates. The second electrical node overlaps the first electrical node in the overlap between the first and second substrates. A conductive material is within the overlap between the first and second substrates and electrically bonds the first and second electrical nodes to one another. The invention also encompasses termite sensing devices, methods of forming electrical apparatuses, and methods of sensing termites.

30 Claims, 8 Drawing Sheets

U.S. PATENT DOCUMENTS

| | | | |
|---|---|---|---|
| 5,571,967 A | 11/1996 | Tanaka et al. | 73/587 |
| 5,575,105 A | 11/1996 | Otomo | 43/132.1 |
| 5,592,774 A | 1/1997 | Galyon | 43/124 |
| 5,646,404 A | 7/1997 | Litzkow et al. | 250/338.1 |
| 5,648,758 A | 7/1997 | Tweadey | 340/550 |
| 5,815,090 A | 9/1998 | Su | 340/870.16 |
| 5,877,422 A | 3/1999 | Otomo | 73/587 |
| 5,950,356 A | 9/1999 | Nimocks | 43/131 |
| 5,974,344 A | 10/1999 | Shoemaker | 607/149 |
| 5,977,913 A | 11/1999 | Christ | |
| 6,052,066 A | 4/2000 | Su | |
| 6,061,243 A | 5/2000 | Barnett et al. | |
| 6,091,332 A * | 7/2000 | Eberhardt et al. | 340/572.1 |
| 6,130,602 A | 10/2000 | O'Toole | 340/825.54 |
| 6,150,944 A | 11/2000 | Martin et al. | 340/632 |

* cited by examiner

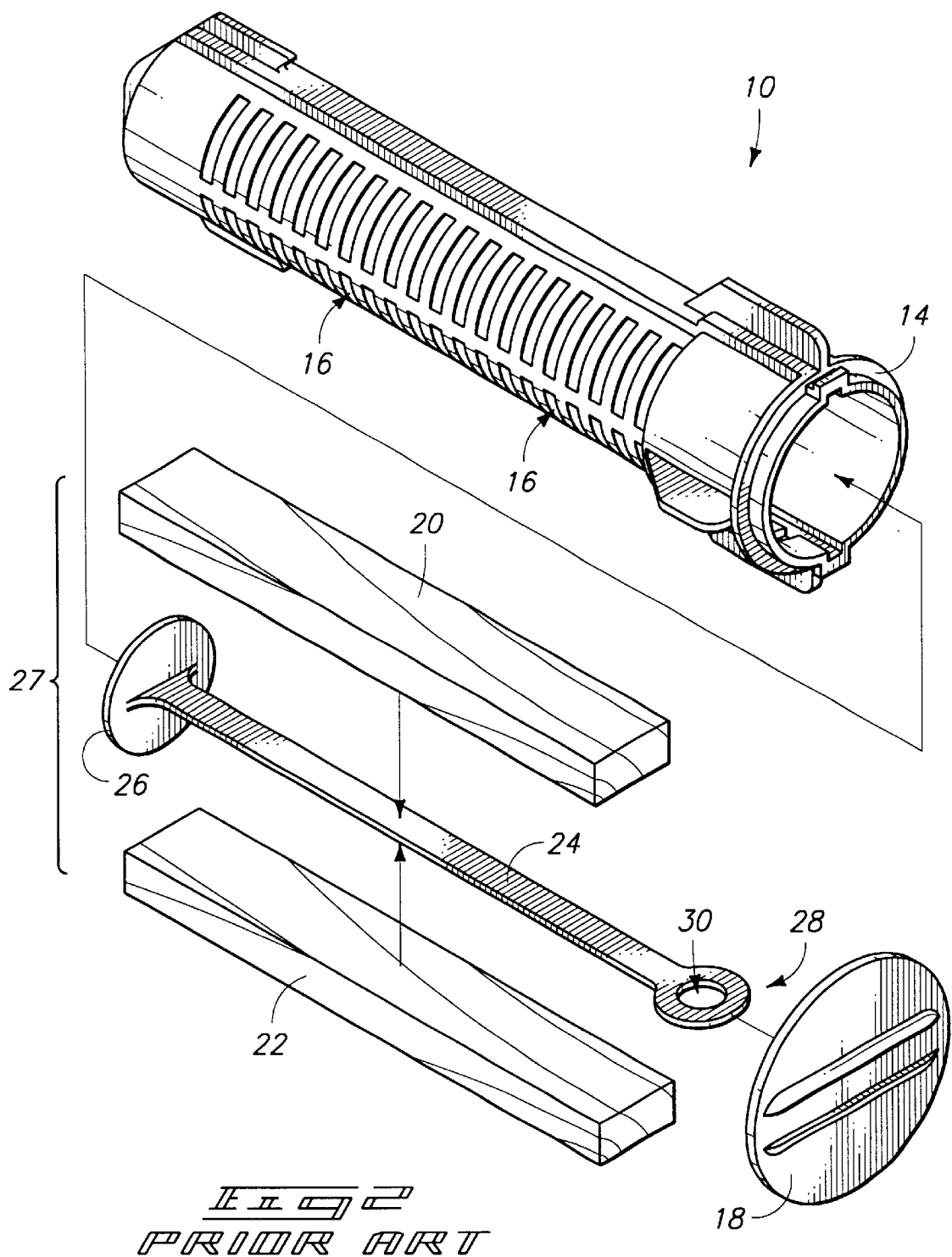

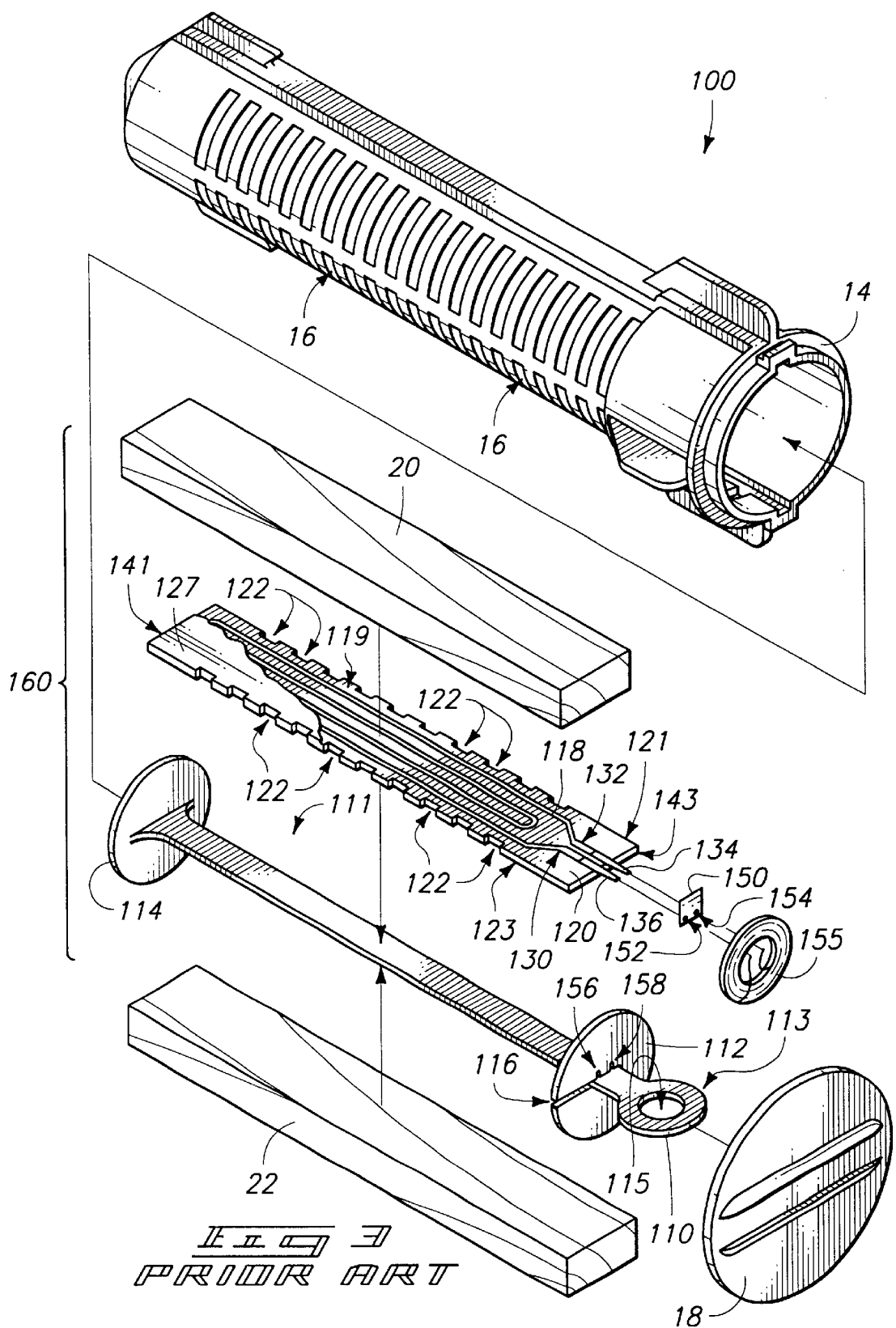

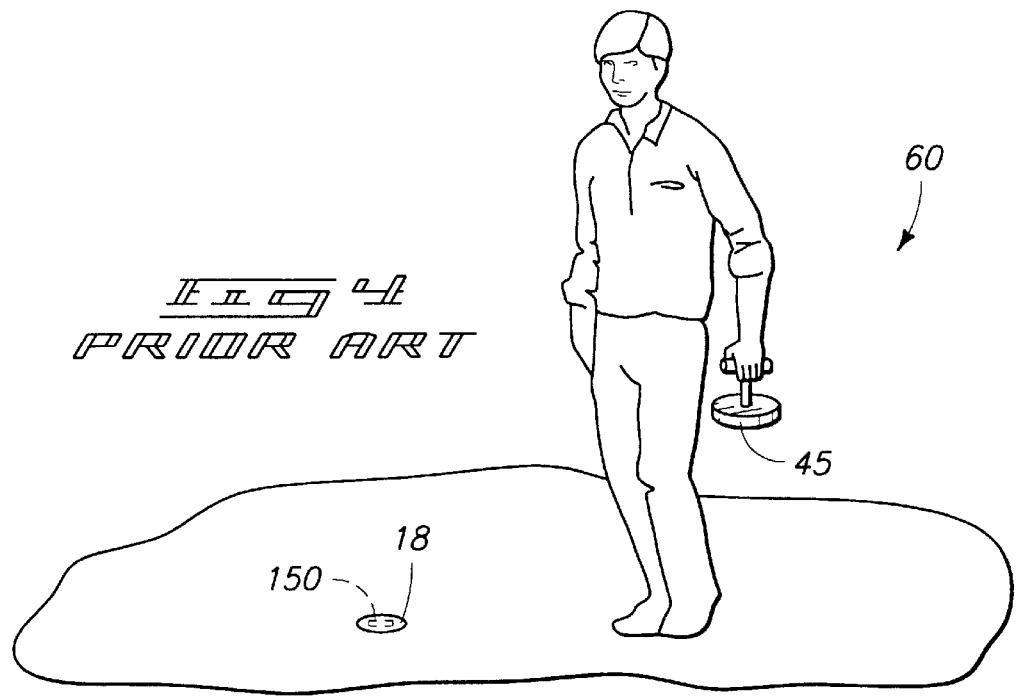
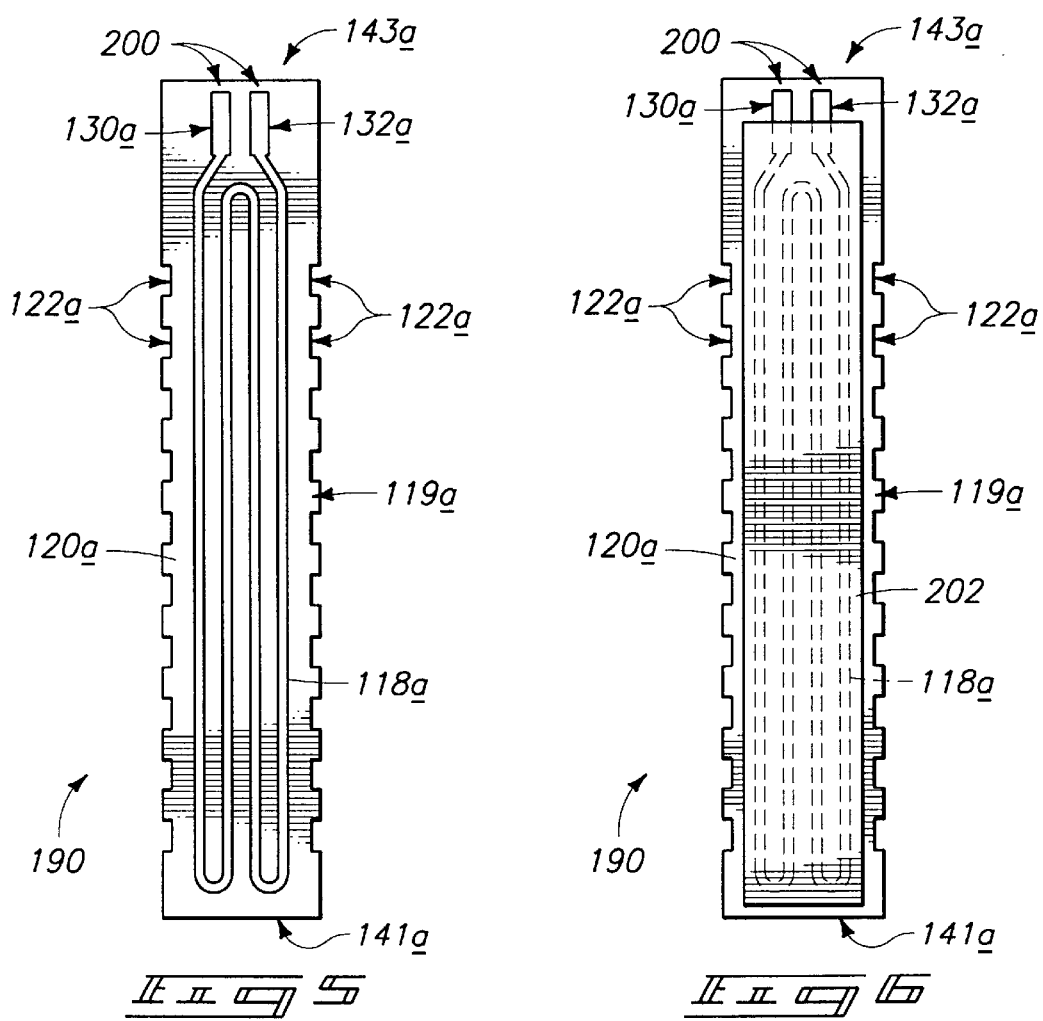

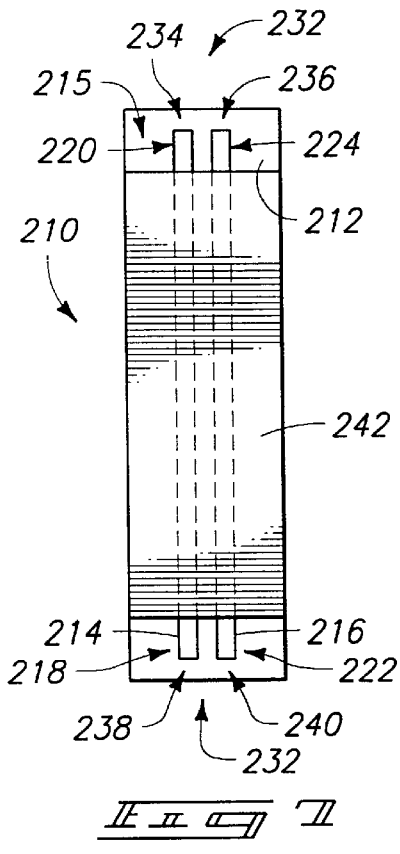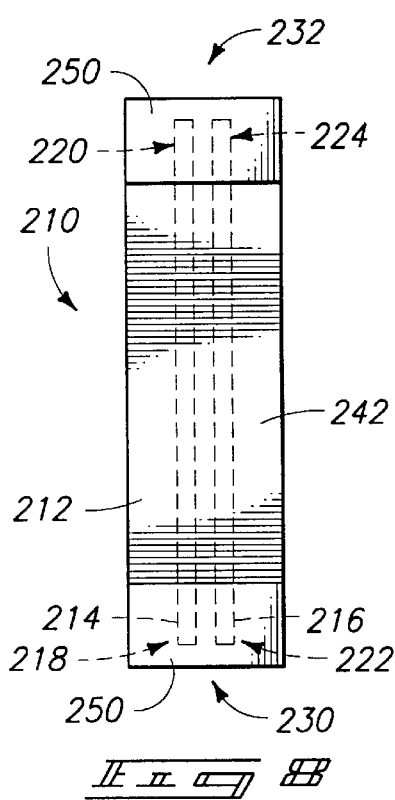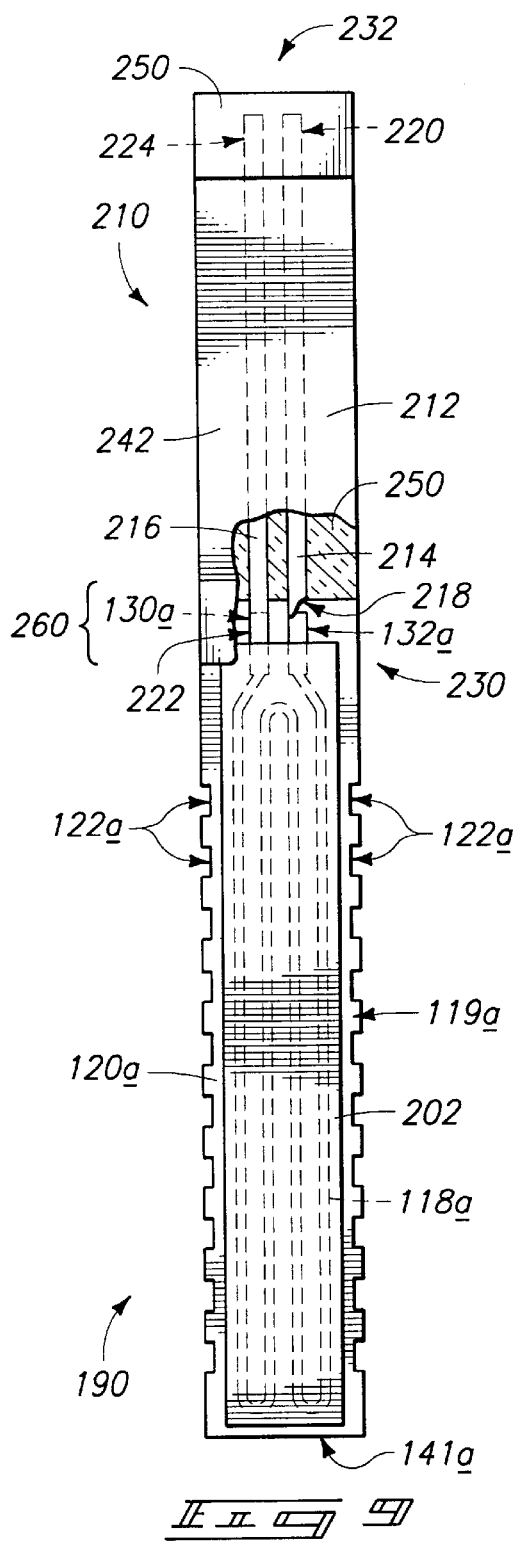

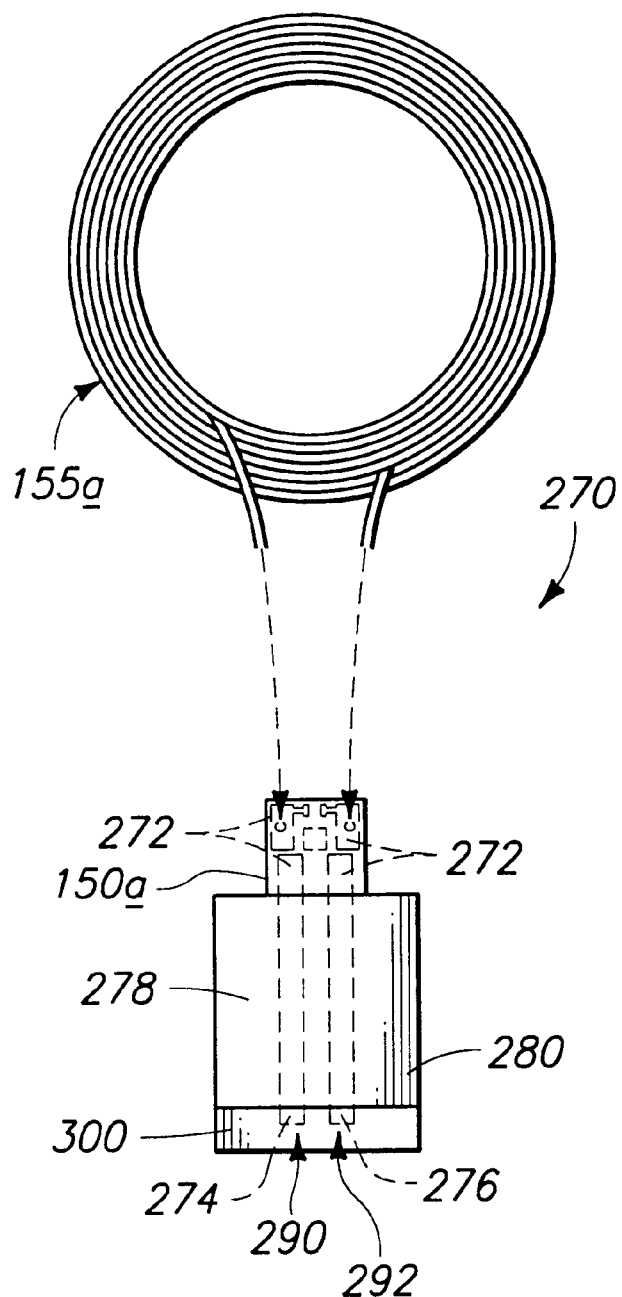

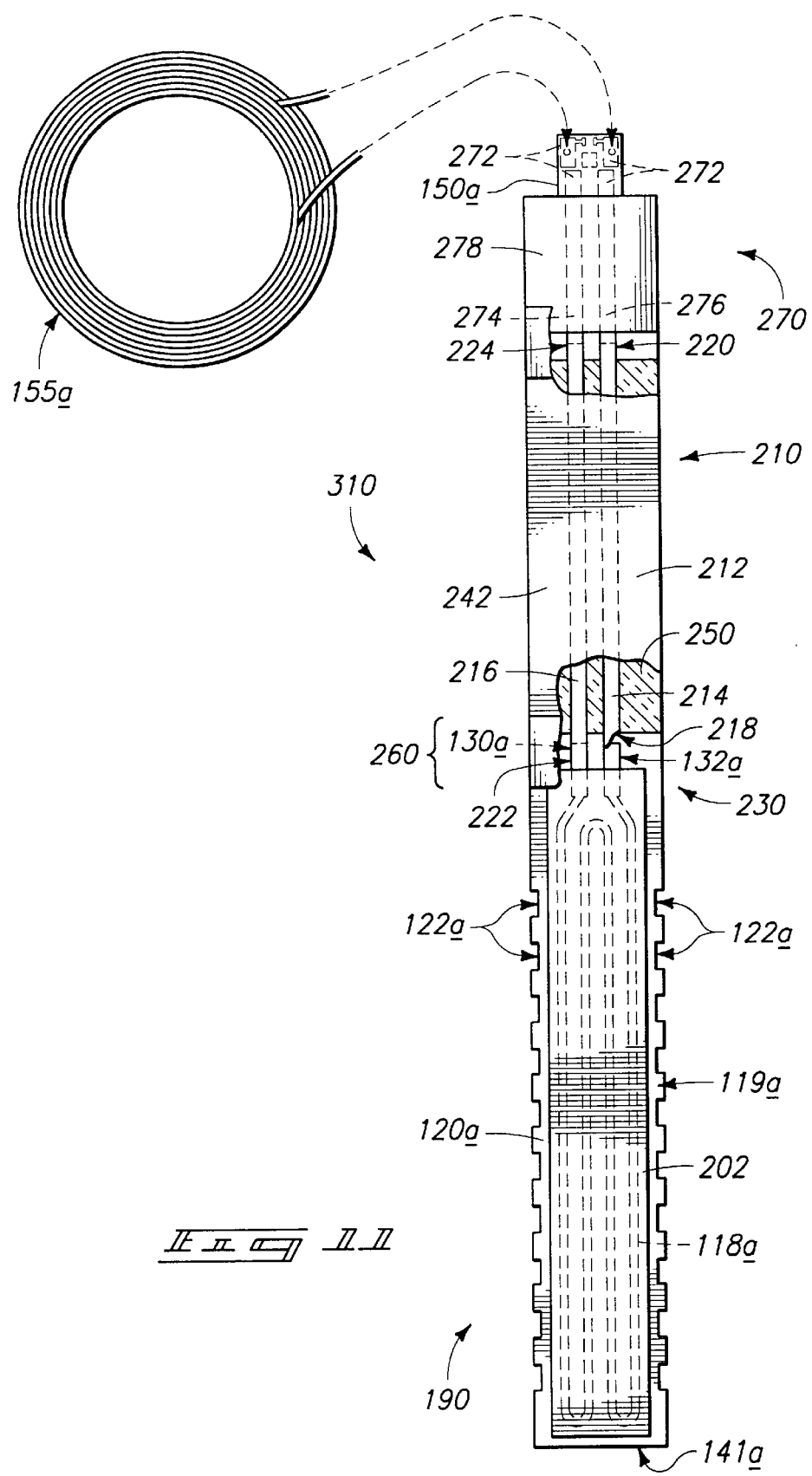

ELECTRICAL APPARATUSES, AND METHODS OF FORMING ELECTRICAL APPARATUSES

RELATED PATENT DATA

This patent resulted from a divisional application of U.S. patent application Ser. No. 09/384,836, which was filed on Aug. 27, 1999.

TECHNICAL FIELD

The invention pertains to electrical apparatuses, termite sensing apparatuses, and methods of forming electrical apparatuses.

BACKGROUND OF THE INVENTION

A prior art apparatus and method for detecting termite infestation is described with reference to FIGS. 1 and 2. Specifically, a termite detection device 10 is shown in an assembled configuration and inserted within the ground 12 in FIG. 1, and is shown in a disassembled configuration in FIG. 2. Device 10 comprises an outer receptacle 14 having a plurality of orifices 16 (only some of which are labeled) extending therethrough. A cap (or a lid) 18 is provided to cover the top of receptacle 14. Preferably, receptacle 14 is inserted into the ground to a depth at which cap 18 will rest approximately at a surface of the ground.

A pair of wooden blocks 20 and 22 are provided within receptacle 14, and constitute "bait" for termites proximate to device 10. A holder 24 is provided between blocks of wood 20 and 22 and comprises a shelf 26 upon which blocks 20 and 22 rest. Holder 24 and blocks 20 and 22 together comprise an assembly 27 which can be removably inserted into receptacle 14.

Holder 24 comprises a portion 28 which protrudes upwardly beyond blocks 20 and 22 in the assembled configuration of FIG. 1. Portion 28 comprises an eye 30 (shown in FIG. 2) which can simplify removal of assembly 27 from receptacle 14 using a tool with a hook.

In operation, receptacle 14 is inserted into ground 12, and blocks 20 and 22 are subsequently left in receptacle 14 for a period of time. Blocks 20 and 22 function as a sensing apparatus to determine if a termite infestation is present in an area proximate device 10. Specifically, if termites are present, such will penetrate through orifice 16 to reach wooden blocks 20 and 22. The termites will then burrow into the wooden blocks 20 and 22.

At regular intervals, cap 18 is removed and blocks 20 and 22 withdrawn from device 14. Blocks 20 and 22 are then surveyed for termite-inflicted damage, and possibly a presence of termites themselves.

Generally, a number of apparatuses 10 will be spread around a given location, such as, for example, a house or other wooden structure. Each of the apparatuses will be checked at a regular interval to determine if a termite infestation is occurring proximate the structure. Also, each of the devices will be mapped relative to one another, and relative to the structure. A comparison of the amount of termite-inflicted damage occurring at the respective devices 10 can then enable a person to determine an approximate localized region of any occurring termite infestation. It can be advantageous to pinpoint a localized region of infestation as such can limit an amount of pesticide utilized for destroying the termites.

Difficulties can occur in monitoring the amount of termite-inflicted damage occurring at each of the many devices 10 provided around a structure. For instance, it can be difficult to regularly and accurately document the amount of damage at each of the devices. As an example, it can be difficult to remember exactly which of the various devices correlates to a specific location on a map of the devices. As another example, it can be difficult to accurately record a reading of termite-inflicted damage associated with an individual device. As yet another example, it can be tedious and time-consuming to open all of the receptacles 14 proximate the given structure and manually check the blocks 20 and 22 within the receptacles for termite-inflicted damage.

One method of reducing the above-discussed difficulties is to provide bar codes on the lids 18 of receptacles 14. Such bar codes can be scanned to specifically identify a particular device which can simplify correlating the devices to locations on a map of the devices. However, ascertaining an amount of termite-inflicted damage can still be time-consuming in that the receptacles still have to be opened and the blocks of wood manually checked to determine if termite-inflicted damage has occurred to the wood.

A recently proposed improvement for monitoring an amount of termite-inflicted damage in a device similar to device 10 is described with reference to FIGS. 3 and 4. Referring to FIG. 3, a device 100 comprises a receptacle 14 of the type described above with reference to FIG. 1, and comprises a cap 18 configured to be received over an open type of receptacle 14. Device 100 further comprises the pair of wooden blocks 20 and 22, and a holder 110 similar to the holder 24 described above with reference to FIG. 1. Holder 110 can comprise, for example, plastic, and differs from holder 24 in that it comprises both a top shelf 112 and a bottom shelf 114, whereas holder 24 only comprised a bottom shelf. In the shown embodiment, shelf 112 is configured with a slit 116 so that shelf 112 can be slid over a prior holding device (such as the device 24 of FIG. 1) to form the holding device 110. Slit 116 is optional, and shelf 112 can be molded in one piece with the other components of holder 110. Holder 110 can be considered as comprising a pillar 111 extending between shelves 112 and 114, and an extension 113 protruding above shelf 112. Extension 113 is configured to enable a person to lift holder 110 by the extension, and in the shown embodiment comprises an eye 115 extending therethrough. Shelf 112 can comprise an electrically insulative material, such as, for example, plastic (for instance, polypropylene).

Device 100 further comprises an electronic termite sensing loop 118 of conductive material. Loop 118 is formed on a substantially planar substrate 120, and is preferably formed of material which can be removed by termites. Exemplary materials are printable materials comprising conductive particles, such as, for example, metal particles or carbon particles. Suitable materials are, for example, silver-filled printed thick film ink and silver-filled epoxy. An exemplary silver-filled ink is Dupont Electronics 5028™ (available from Dupont Electronics of Wilmington, Del.), which is a silver polymer conductor. Another suitable material for loop 118 is a carbon-particle-containing ink (typically the particles will consist essentially of carbon), such as, for example, a material marked by Dupont Electronics as 7102™ Carbon Polymer Conductor (available from Dupont Electronics of Wilmington, Delaware). Carbon-particle-containing inks can be cheaper than other inks, better accepted by pests (i.e., apparently more palatable to the pests), and less subject to environmental damage. Further, the inclusion of carbon inks in a circuit can lower an electrical conductivity (i.e., raise a resistivity) of the circuit. The lowered conductivity can increase the reliability of data obtained from the circuit. More specifically, the inclusion of carbon-particle-containing inks in loop 118 can render the circuit of loop 118 less susceptible to registering false negative readings if mud or water bridges an opening in the circuit.

Substrate 120 is preferably formed of material which can be removed by termites. Exemplary materials are polyethylene foam and polyester. The conductive material of loop 118 can be directly applied to substrate 120 using, for example, screen printing methods. Substrate 120 can be pretreated prior to applying the conductive material of loop 118 over substrate 120. Such pretreatment can comprise, for example, flame pretreatment to promote adhesion of the conductive material to the foam.

An electrically insulative protective material 127 (only some of which is shown in FIG. 3) is provided over loop 118 and substrate 120. Protective material 127 can protect conductive loop 118 from water, abrasion or other environmental damage. the insulative protective material can comprise, for example, a resin which is provided as a liquid and cured by exposure to one or more of heat, ultraviolet light and oxygen. A suitable insulative protective material is a material selected from the general class of epoxy resins (such as, for example, a two-part epoxy resin). Another suitable insulative protective material is a material selected for the general class of thick film inks. Exemplary insulative protective materials are Dupont 5015™ and 5018™ (available from Dupont Electronics of Wilmington, Del.), with 5018™ being an ultraviolet light curable dielectric material. Another exemplary insulative protective material is a tape adhered over loop 118 with an adhesive.

A termite attractant (such as, for example, a suitable pheromone) can be provided in addition to the insulative protective material. Such attractant can, for example, be formed over the insulative protective material or blended within the insulative protective material.

In the shown configuration, substrate 120 comprises a pair of opposing sidewall edges 121 and 123, and a plurality of notches 122 extending into sidewall edges 121 and 123. Notches 122 are provided to form crevices within which the termites can burrow.

Conductive loop 118 comprises a pair of ends (130 and 132), with end 132 connected to a first prong 134 and end 130 connected to a second prong 136. Device 100 further comprises a circuit board 150 having circuitry (not shown in FIG. 3) supported thereby and a pair of orifices (152 and 154) extending therethrough. Board 150 can be considered as a circuit support. Shelf 112 has a pair of orifices 156 and 158 extending therethrough, and configured to be aligned with orifices 152 and 154 of circuit board 150. In operation, device 100 is assembled by providing substrate 120 within holder 114 such that prongs 134 and 136 extend through orifices 156, 158, 152 and 154 to retain circuit board 150 atop shelf 112. Circuit board 150 can then be adhered to shelf 112 and/or prongs 134 and 136. Blocks 20 and 22 are subsequently provided within holder 110 to form an assembly 160 which can be removably inserted within receptacle 14.

The circuitry supported by circuit board 150 can comprise at least a portion of a transponder unit and is configured to be incorporated into a passive radio frequency identification device (RFID) system. The transponder unit can comprise, for example, a parallel resonant LC circuit, with such circuit being resonant at a carrier frequency of an interrogator. The transponder unit is in electrical connection with an antenna 155 provided externally of the circuitry supported by board 150. Exemplary circuit board/transponder unit assemblies are described in U.S. patent application Ser. No. 08/705,043, filed Aug. 29, 1996, which is assigned to the assignee of the present invention and hereby incorporated by reference.

Referring to FIG. 4, an RFID system 60 comprises the transponder supported by a structure 150 (which can comprise, for example, a circuit board) and an interrogator 45 configured to be passed over such transponder unit. Interrogator 45 comprises a coil antenna configured to stimulate the transponder unit. Such coil antenna consists of one or more coils of conductive material provided within a single plane, and can be in the form of, for example, a loop antenna.

In operation, interrogator 45 provides a carrier signal which powers (stimulates) the transponder unit supported by board 150 and causes a signal to be transmitted from the transponder unit. The signal comprises data which identifies the transponder unit. Such signal can also identify if the conductive loop 118 is broken. The signal is received by interrogator 45, and eventually provided to a processing system configured to decode and interpret the data. Such processing system can be provided in a portable unit with interrogator 45, or can be provided in a separate unit to which data from interrogator 45 is subsequently downloaded.

By having a signal from the transponder unit change with a break in circuit 118, device 100 can indicate if damage has occurred to loop 118 through a signal sent to an interrogator. Such can enable persons utilizing the device to ascertain if termites are present without having to remove blocks 20 and 22 from receptacle 14, and even without having to remove the lid 18 from receptacle 14. Once damage to circuit 118 is detected with an interrogator, persons can remove assembly 160 and quantitate an amount of damage occurring within blocks 20 and 22 to determine an extent of termite infestation.

The device 160 is suitable for many applications in which it is desired to detect termite infestation. However, the device can be difficult to assemble and utilize in particular applications. Accordingly, it would be desirable to develop alternative devices for detecting termite infestation.

SUMMARY OF THE INVENTION

In one aspect, the invention encompasses an electrical apparatus. Such apparatus comprises a first substrate having first circuitry thereon. The first circuitry has a terminal extending therefrom, and the terminal defines a first electrical node. The apparatus further comprises a first dielectric material covering a predominate portion of the first circuitry and not covering the first electrical node. Additionally, the apparatus comprises a second substrate having second circuitry thereon. The second circuitry has a terminal extending therefrom, and such terminal defines a second electrical node. A second dielectric material covers a predominate portion of the second circuitry, but does not cover the second electrical node. The second substrate comprises a different material than the first substrate. A portion of the second substrate is over a portion of the first substrate to define an overlap between the first and second substrates. The second electrical node overlaps the first electrical node in the overlap between the first and second substrates. A conductive material is within the overlap between the first and second substrates and electrically bonds the first and second electrical nodes to one another.

In another aspect, the invention encompasses a termite sensing apparatus. Such apparatus comprises a first substrate having a conductive loop thereon. The loop has a pair of terminals extending therefrom, with the terminals defining first and second electrical nodes. A first dielectric material covers a predominate portion of the conductive loop and defines a fluid-type protective layer over such predominate portion of the conductive loop. The first dielectric material does not cover the first and second electrical nodes. The termite sensing apparatus further comprises a second substrate having a pair of conductive lines thereon. The conductive lines are a first line and a second line, and are spaced from one another. The first conductive line has a pair of opposing ends, and the second conductive line has a pair of opposing ends. One of the opposing ends of the first conductive line defines a third electrical node, and the other of the opposing ends of the first conductive line defines a fourth electrical node. One of the opposing ends of the second conductive line defines a fifth electrical node, and the other of the opposing ends of the second conductive line defines a sixth electrical node. The third and fifth electrical nodes are proximate one another. A portion of the second substrate is over a portion of the first substrate to define an overlap between the first and second substrates. The third electrical node overlaps the first electrical node in the overlap between the first and second substrates, and the fifth electrical node overlaps the second electrical node in such overlap between the first and second substrates. A conductive material is within the overlap between the first and second substrates. Such conductive material electrically bonds the first and third electrical nodes to one another, and electrically bonds the second and fifth electrical nodes to one another.

In yet other aspects, the invention encompasses methods of forming electrical apparatuses.

BRIEF DESCRIPTION OF THE DRAWINGS

Preferred embodiments of the invention are described below with reference to the following accompanying drawings.

FIG. 2 is a perspective view of the prior art termite sensing device of FIG. 1 in a disassembled configuration.

FIG. 3 is a disassembled view of a prior art electronic sensor configured to detect termite infestation.

FIG. 4 is a diagrammatic view of a person extracting information from the prior art electronic termite sensing device of FIG. 3.

FIG. 5 is a diagrammatic view of a portion of a termite sensing device encompassed by the present invention at an initial step of a method of the present invention.

FIG. 6 is a view of the FIG. 5 portion shown at a processing step subsequent to that of FIG. 5.

FIG. 7 is a diagrammatic view of a second portion of a termite sensing device of the present invention, and shown at an initial processing step.

FIG. 8 is a view of the FIG. 7 portion shown at a processing step subsequent to that of FIG. 7.

FIG. 9 is a diagrammatic view of an assembly comprising the first portion of FIG. 6, and the second portion of FIG. 8.

FIG. 10 is a partially disassembled, diagrammatic view of a third portion of a termite sensing device encompassed by the present invention.

FIG. 11 is a partially disassembled, diagrammatic view of a device comprising the assembly of FIG. 9, joined with the third portion of FIG. 10.

DETAILED DESCRIPTION OF THE PREFERRED EMBODIMENTS

Figure 1:
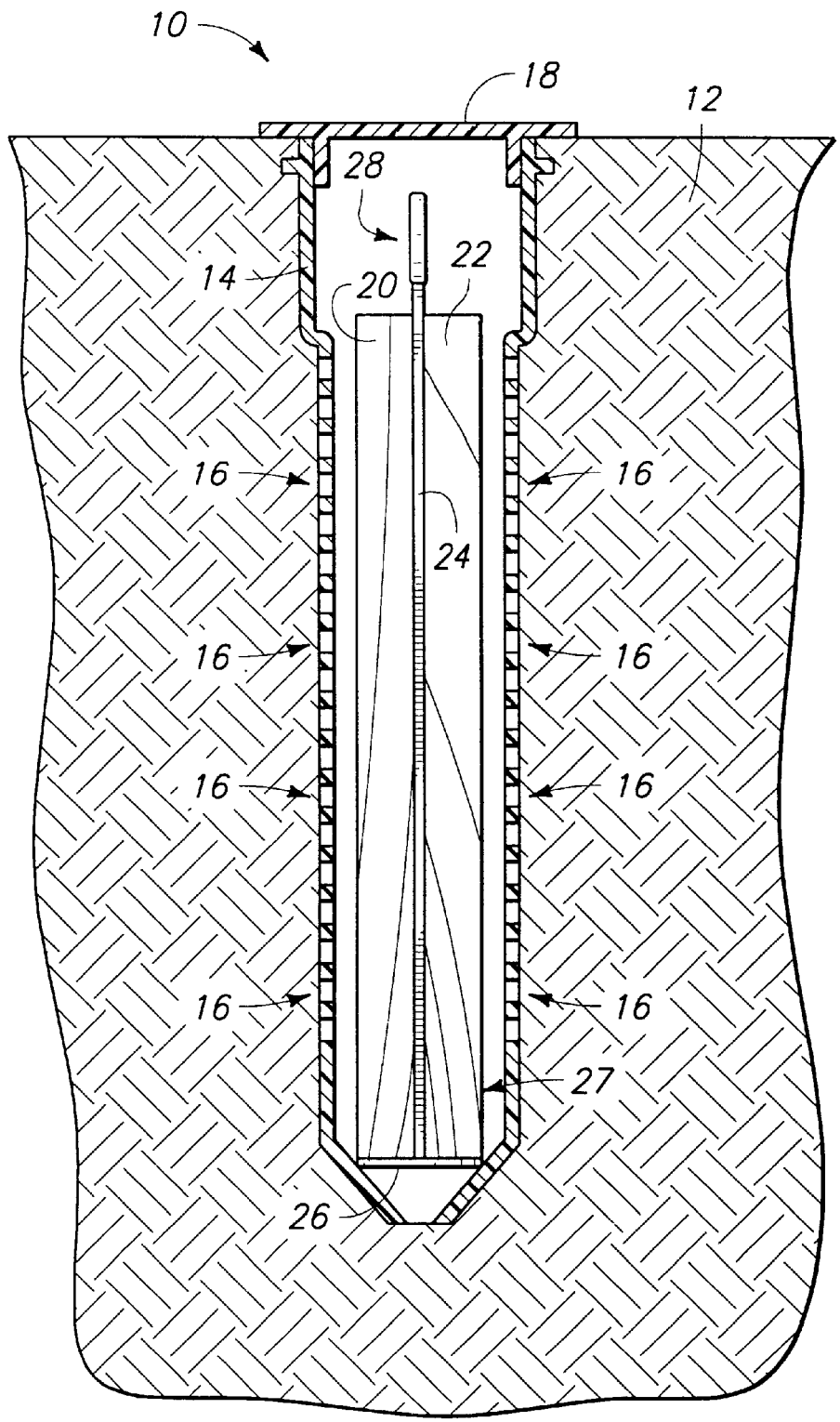
FIG. 1 is a diagrammatic, cross-sectional view of an assembled prior art termite sensing device embedded in the ground.

This disclosure of the invention is submitted in furtherance of the constitutional purposes of the U.S. Patent Laws "to promote the progress of science and useful arts" (Article 1, Section 8).

A difficulty which can occur in forming the prior art termite sensing device of FIG. 3 is in connecting circuit support 150 with prongs 134 and 136. It is desired to have the circuitry associated with support 150 be planar along a surface of the ground so that it can be readily stimulated by an interrogator passed along the ground surface and over such circuitry, and it is further desirable to have the circuitry of loop 118 extending perpendicular with the surface of the ground so that such circuitry is likely to be intercepted by termites passing at various depths beneath a ground surface. An apparent solution for connecting loop 118 to circuitry associated with board 150, without having to utilize prongs 134 and 136, is simply to bend support 120 so that part of loop 118 will extend perpendicular to a ground surface, and another part (specifically, the ends of the loop) will extend substantially parallel with the surface of the ground. However, such will require a 90° bend in foam substrate 120, which would likely break the substrate and accordingly break the circuit of loop 118. The present invention provides a mechanism by which circuitry can be bent to enable a connection from the conductive loop extending perpendicular to a ground surface to a transponder circuit extending parallel with the ground surface.

Figure 12:
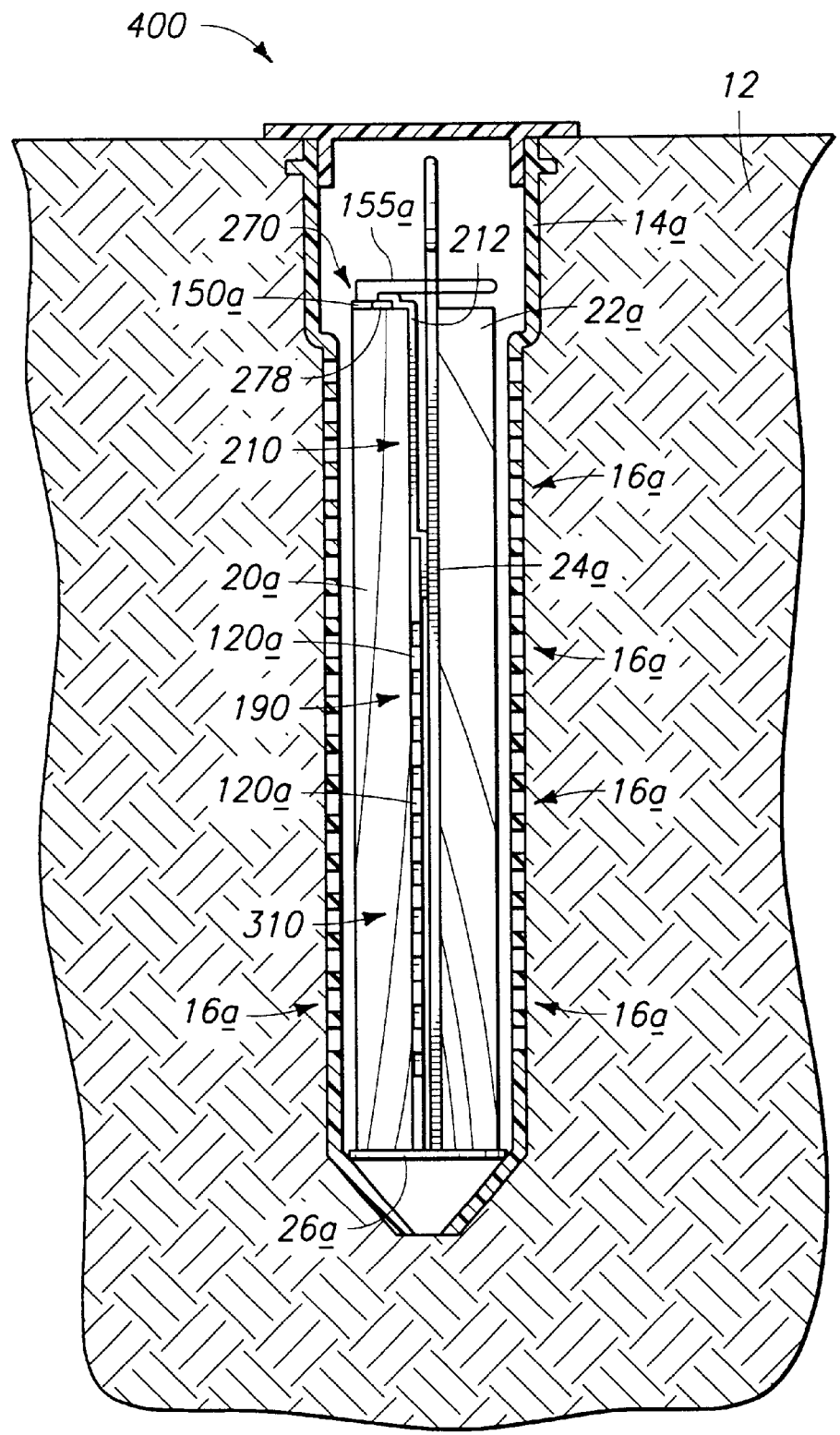
FIG. 12 is a diagrammatic side view of a termite sensing device encompassed by the present invention.

An assembly encompassed by the present invention is shown in FIG. 12, and a method of forming such assembly is described with reference to FIGS. 5–12. In referring to FIGS. 5–12, similar numbering will be utilized as was used in describing the prior art, with the suffix "a" used to differentiate structures of FIGS. 5–12 from the corresponding structures of the prior art FIGS. 1–4.

Referring to FIG. 5, a first portion 190 of a termite sensing device of the present invention is shown. Portion 190 comprises a first substrate 120a. Substrate 120a is similar to substrate 120 of the prior art (FIG. 3), and preferably comprises a material which can be removed by termites, and can comprise, for example, polyethylene foam. Substrate 120a comprises notches 122a formed therein, and such notches can provide crevices within which termites can burrow.

Substrate 120a has an upper surface 119a, and a conductive material loop 118a is formed on such surface. Loop 118a can be formed utilizing methodology described above for forming loop 118 (FIG. 3), such as, for example, by screen printing one or both of a carbon-particle-containing ink and a metal-containing ink onto substrate 120. Loop 118a has a pair of ends (or terminals) 130a and 132a extending therefrom. Terminals 130a and 132a define first and second electrical nodes, respectively. Terminals 130a and 132a comprise a thickened region of the conductive material relative to the rest of loop 118a. Such thickened region of conductive material can simplify connection of terminals 130a and 132a to other circuitry (described below). Substrate 120a has a pair of opposing ends 141a and 143a. Terminals 130a and 132a are proximate end 143a of substrate 120a, but are spaced from such end by gaps 200. Such spacing can enable terminals 130a and 132a to be completely protected from the environment by simply providing a protective covering over surface 119a and loop 118a. In contrast, if terminals 130a and 132a extended all the way to end 143a, the terminals would have a surface exposed over end 143a, and such surface could be difficult to protect from the environment. It is to be understood, however, that the shown embodiment is an exemplary embodiment, and that the invention encompasses other embodiments (not shown) having other configurations. Such other embodiments include, for example, embodiments in which terminals 130a and 132a extend to, and even beyond, end 143a.

Referring to FIG. 6, a dielectric material 202 is provided over a predominate portion of conductive loop 118a (shown in phantom view in FIG. 6). Specifically, dielectric material 202 covers an entirety of loop 118a except for the ends of terminals 130a and 132a. The uncovered ends 130a and 132a define first and second electrical nodes, respectively. Dielectric material 202 can comprise, for example, materials described above for prior art layer 127 (FIG. 3), and can form a fluid-tight protective layer over conductive loop 118a. Dielectric material 202 can have a termite attractant (such as, for example, a termite-attracting pheromone) mixed therein.

Referring to FIG. 7, a second portion. 210 of a termite sensing device of the present invention is shown. Portion 210 comprises a second substrate 212 having an upper surface 215, and pair of conductive lines 214 and 216 formed on surface 215. Substrate 212 preferably comprises a flexible material, such as, for example, polyester or other plastics. Conductive lines 214 and 216 can comprise the same material utilized for conductive loop 118a, and can be printed onto substrate 212 by, for example, screen printing. In embodiments in which substrate 212 comprises an insulative material, conductive lines 214 and 216 can be printed directly onto the material. In other embodiments (not. shown) substrate 212 can comprise a conductive material, and a dielectric material can be provided over such conductive material prior to the forming of conductive lines 214 and 216 over the substrate. Conductive lines 214 and 216 together comprise a circuit pattern formed over substrate 212. Conductive line 214 can be referred to as a first conductive line, and conductive line 216 can be referred to as a second conductive line.

First conductive line 214 comprises a pair of ends (218 and 220), and second conductive line 216 comprises another pair of ends (222 and 224). End 222 of second conductive line 216 is proximate end 218 of first conductive line 214, and end 224 of second conductive line 216 is proximate end 220 of first conductive line 214. Ends 218, 220, 222 and 224 define electrical nodes. Electrical nodes 222 and 224 are referred to herein as a third electrical node and fourth electrical node, respectively, and electrical nodes 218 and 220 are referred to herein as a fifth and sixth electrical node, respectively.

Substrate 212 comprises a pair of opposing ends 230 and 232. Conductive lines 214 and 216 are spaced from end 230 by gaps 234 and 236, respectively, and are spaced from end 232 by gaps 238 and 240, respectively.

A dielectric material 242 is formed over a predominate portion of circuitry 218. Dielectric material 242 can comprise the same materials described above with reference to dielectric material 127 of the prior art (FIG. 3). Dielectric material 242 does not cover the ends of conductive lines 214 and 216, and accordingly leaves the third, fourth, fifth and sixth electrical nodes exposed. Dielectric material 242 can form a fluid-tight protective coating over the predominate portion of 218 covered by such dielectric material.

Referring to FIG. 8, a conductive material 250 is provided over ends 218, 220, 222 and 224. Conductive material 250 can comprise, for example, an adhesive having conductive particles dispersed therein. A suitable adhesive is 3M #9703™ electrically conductive adhesive transfer tape (Z-axis tape), available from 3M Corporation of St. Paul, Min. The material is referred to as a Z-axis adhesive because such material conducts electricity only in a Z-axis direction. Accordingly, the material will not form a short between conductive lines 214 and 216, but can form electrical connections from conductive lines 214 and 216 to other circuitry formed thereover. In the preferred embodiment, the conductive adhesive overlaps the edges of dielectric material 242, and extends from the edges to ends 230 and 232 of substrate 212. The Z-axis adhesive 250 and dielectric material 242 thus can together comprise a fluid-tight seal which extends entirely over conductive lines 214 and 216, as well as entirely over the surface 215 of substrate 212 (FIG. 7).

In embodiments in which the conductive adhesive 250 comprises a Z-axis tape, the adhesive will be provided with a release liner adhered thereto. Such release liner can be left in place in forming the construction shown in FIG. 8.

Referring to FIG. 9, the assembly 210 of FIG. 8 is adhered to the assembly 190 of FIG. 6 utilizing the adhesive 250 proximate end 230. (In embodiments in which conductive adhesive 250 comprises a Z-axis tape, the release liner over Z-axis tape 250 proximate end 230 will be removed prior to forming the construction of FIG. 9.) The assembly 210 is inverted relative to assembly 190 in the FIG. 9 construction such that so-called upper surface 215 (FIG. 7) of substrate 212 faces downwardly toward upper surface 119a of substrate 120a. Such enables electrical connection of nodes 218 and 222 with nodes 132a and 130a, respectively.

Substrate 212 overlaps with substrate 120a in an overlap region 260. Also, third electrical node 222 overlaps with first electrical node 130a in overlap region 260, and fifth electrical node 218 overlaps with second electrical node 132a in such overlap region. Conductive material 250 bonds third electrical node 222 to first electrical node 130a, and fifth electrical node 218 to second electrical node 132a. In embodiments in which material 250 comprises a Z-axis adhesive, such material can form a conductive bond between the first and third nodes, as well as between the second and fifth nodes, without causing a short between conductive lines 214 and 216.

In the shown embodiment, dielectric material 202 and dielectric material 242 both extend into the overlap region 260. Such can assist in forming a water-tight seal within overlap region 260. A water-tight seal is desired to prevent water from leaking between lines 214 and 216, and causing an electrical short between such lines.

Referring to FIG. 10, a transponder assembly 270 is shown in a partially disassembled view. Transponder assembly 270 comprises a circuit supporting substrate 150a, and circuitry 272 (shown in phantom due to its being beneath a layer 280) formed over substrate 150a. Circuitry 272 is preferably configured to define at least a portion of a transponder device. An antenna 155a connects to circuitry 272 and extends over substrate 150a.

Circuitry 272 is connected with a pair of terminals 274 and 276 (shown in phantom due to their being beneath layers 280 and 300). A substrate 278 is joined to board 150a, and supports terminals 274 and 276. Substrate 278 is preferably a flexible material, such as, for example, polyethylene or other forms of plastic. Terminals 274 and 276 can comprise a printed conductive material, and can comprise, for example, the materials discussed above for forming conductive loop 118a. Alternatively, terminals 274 and 276 can comprise, for example, metal wires.

A dielectric material 280 is shown formed over substrates 150a and 278. Dielectric material 280 encapsulates circuitry 272 and predominate portions of conductive lines 274 and 276. Dielectric material 280 can comprise, for example, the materials described above for utilization in dielectric material 202.

Terminals 274 and 276 comprise ends 290 and 292, respectively. Ends 290 and 292 define seventh and eighth electrical nodes, respectively. Dielectric material 280 does not cover such electrical nodes. A conductive adhesive 300 is provided over the electrical nodes defined by ends 290 and 292, as well as over a portion of substrate 278 proximate ends 290 and 292 (i.e., a terminal, or end, portion of substrate 278). Conductive adhesive 300 can comprise, for example, a Z-axis adhesive of the type described above for material 250.

Referring to FIG. 11, assembly 270 is combined with assemblies 190 and 210 to form a termite sensing device 310. Preferably, the transponder encompassed by circuitry 272 is configured to emit a first signal when conductive loop 118a is intact, and a second signal if conductive loop 118a is broken, with the second signal being different than the first signal.

It is noted that one or the other of conductive adhesive 300 on assembly 270 and conductive adhesive 250 proximate end 232 of assembly 210 is optional, in that conductive adhesive applied to either of assemblies 270 or 210 can be utilized to bind the assemblies 270 and 210 together. It is further noted that substrate 278 and terminals 274 and 276 are optional, and that circuitry 272 can be directly bonded to ends 220 and 224 of lines 214 and 216.

Referring to FIG. 12, sensing device 310 is shown incorporated into a termite detecting device 400. The relative scales of portions 190, 210 and 270 are changed in the view of FIG. 12 relative to FIGS. 5–11, with the relative scales in FIG. 12 being a more preferred application of the invention, and the relative scales of FIGS. 5–11 being utilized for illustration purposes.

FIG. 12 shows sensing device 310 provided between a pair of wooden blocks 20a and 22a, and adjacent a holder 24a that is also provided between the wooden blocks. Substrate 190 is between blocks 20a and 22a, whereas flexible substrate 210 extends from between blocks 20a and 22a to over block 20a. Flexible substrate 210 is bent around a corner of block 20a. The overlap of substrate 212 relative to substrates 120a and 278 can be seen in the view of FIG. 12.

It is noted that antenna 155 is shown overlapping substrate 212, and received over both of blocks 20a and 22a. Such can be accomplished by sliding the loop antenna over an upper portion of holder 24a. Antenna 155 can be joined to circuitry 272 (FIG. 10) before joining substrate 278 with substrate 212, after joining substrate 278 with substrate 212, and/or after providing the rest of assembly 310 between blocks 20a and 22a.

In preferred embodiments, substrate 212 is formed of a more flexible material than substrate 190. Specifically, substrate 190 is preferably formed of a relatively firm foam, which can be removed by termites, whereas substrate 212 is preferably formed of a relatively flexible plastic material, such as, for example, polyethylene. Substrate 212 can then be bent around within receptacle 14a without breaking the substrate, and accordingly without breaking circuitry formed over the substrate.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical apparatus comprising:
   a first substrate having first circuitry thereon, the first circuitry having a terminal extending therefrom, said terminal of the first circuitry defining a first electrical node;
   a second substrate having second circuitry thereon, the second circuitry having a terminal extending therefrom, said terminal of the second circuitry defining a second electrical node, the second substrate comprising a different material than the first substrate, a portion of the second substrate being over a portion of the first substrate to define an overlap between the first and second substrates, the second substrate being more flexible than the first substrate; and
   a conductive material being within the overlap between the first and second substrates and electrically bonding the first and second electrical nodes to one another.

2. The apparatus of claim 1 wherein the first substrate is foam and the second substrate is polyester.

3. The apparatus of claim 1 further comprising third circuitry joined to the second substrate, the third circuitry comprising a radio frequency identification device transponder and being electrically connected to the first circuitry through the second circuitry.

4. The apparatus of claim 1 wherein the first substrate is foam and the second substrate is polyester, and further comprising third circuitry joined to the second substrate, the third circuitry comprising a radio frequency identification device transponder and being electrically connected to the first circuitry through the second circuitry.

5. An electrical apparatus comprising:
   a first substrate having first circuitry thereon, the first circuitry having a terminal extending therefrom, said terminal of the first circuitry defining a first electrical node;
   a first dielectric material covering a predominate portion of the first circuitry and not covering the first electrical node;
   a second substrate having second circuitry thereon, the second circuitry having a terminal extending therefrom, said terminal of the second circuitry defining a second electrical node, the second substrate comprising a different material than the first substrate, a portion of the second substrate being over a portion of the first substrate to define an overlap between the first and second substrates;
   a second dielectric material covering a predominate portion of the second circuitry and not covering the second electrical node, the second electrical node overlapping the first electrical node in the overlap between the first and second substrates; and
   a conductive material being within the overlap between the first and second substrates and electrically bonding the first and second electrical nodes to one another.

6. The apparatus of claim 5 wherein:

the first circuitry comprises a conductive loop;

the second circuitry comprises a pair of spaced conductive lines;

the conductive loop comprises a pair of ends, one of the ends being the first terminal and an other of the ends being a third terminal;

one of the pair lines comprises an end that is the second terminal;

an other of the pair of lines comprises an end that is a fourth terminal; and the third terminal overlaps the fourth terminal in the overlap between the first and second substrates and is bonded to the fourth terminal by the conductive material.

7. The apparatus of claim 5 wherein the conductive material comprises a conductive adhesive.

8. The apparatus of claim 5 wherein the conductive material comprises a Z-axis adhesive.

9. The apparatus of claim 5 wherein the first and second dielectric materials are the same as one another.

10. The apparatus of claim 5 wherein the first and second dielectric materials extend into the overlap between the first and second substrates, and wherein the conductive material overlaps the first and second dielectric materials.

11. The apparatus of claim 5 wherein the first substrate is more rigid than the second substrate.

12. The apparatus of claim 11 wherein the first substrate comprises foam and the second substrate comprises plastic.

13. The apparatus of claim 11 wherein the first substrate comprises foam and the second substrate comprises polyester.

14. A method of forming an electrical apparatus, comprising:

providing a first substrate having first circuitry thereon;

forming a first dielectric material over a predominant portion of the first circuitry, the first dielectric material not covering a portion of the first circuitry;

providing a second substrate having second circuitry thereon, the second substrate comprising a different material than the first substrate;

forming a second dielectric material over a predominant portion of the second circuitry, the second dielectric material not covering a portion of the second circuitry;

placing the first and second substrates relative to one another with a portion of the second substrate being over a portion of the first substrate to define an overlap between the first and second substrates, the uncovered portion of the second circuitry overlapping the uncovered portion of the first circuitry in the overlap between the first and second substrates; and providing a conductive material within the overlap between the first and second substrates to electrically bond the uncovered portions of the first and second circuitries to one another.

15. The method of claim 14 wherein the conductive material comprises a conductive adhesive.

16. The method of claim 14 wherein the conductive material comprises a Z-axis adhesive.

17. The method of claim 14 wherein the first and second dielectric materials are the same as one another.

18. The method of claim 14 wherein the first and second dielectric materials extend into the overlap between the first and second substrates, and wherein the conductive material overlaps the first and second dielectric materials.

19. The method of claim 14 wherein the first substrate is more rigid than the second substrate.

20. The method of claim 19 wherein the first substrate comprises foam and the second substrate comprises plastic.

21. The method of claim 19 wherein the first substrate comprises foam and the second substrate comprises polyester.

22. A method of forming an electrical apparatus, comprising:

providing a first substrate;

printing first circuitry on the first substrate, the first circuitry having a terminal extending therefrom, said terminal of the first circuitry defining a first electrical node;

forming a first dielectric material over a predominate portion of the first circuitry, the first dielectric material not covering the first electrical node;

providing a second substrate;

forming second circuitry on the second substrate, the second circuitry having a terminal extending therefrom, said terminal of the second circuitry defining a second electrical node, the second substrate comprising a different material than the first substrate;

forming a second dielectric material over a predominate portion of the second circuitry, the second dielectric material not being over the second electrical node;

placing the first and second substrates relative to one another with a portion of the second substrate being over a portion of the first substrate to define an overlap between the first and second substrates, the second electrical node overlapping the first electrical node in the overlap between the first and second substrates; and providing a conductive material within the overlap between the first and second substrates to electrically bond the first and second electrical nodes to one another.

23. The method of claim 22 wherein:

the first circuitry comprises a conductive loop and is formed by printing a conductive ink on the first substrate;

the second circuitry comprises a pair of spaced conductive lines and is formed by printing a conductive ink on the second substrate;

the conductive loop comprises a pair of ends, one of the ends being the first terminal and an other of the ends being a third terminal;

one of the pair lines comprises an end that is the second terminal;

an other of the pair of lines comprises an end that is a fourth terminal; and the third terminal overlaps the fourth terminal in the overlap between the first and second substrates and is bonded to the fourth terminal by the conductive material.

24. The method of claim 22 wherein the conductive material comprises a conductive adhesive.

25. The method of claim 22 wherein the conductive material comprises a Z-axis adhesive.

26. The method of claim 22 wherein the first and second dielectric materials are the same as one another and are printed on the first and second substrates, respectively.

27. The method of claim 22 wherein the first and second dielectric materials extend into the overlap between the first and second substrates, and wherein the conductive material overlaps the first and second dielectric materials.

28. The method of claim 22 wherein the first substrate is more rigid than the second substrate.

29. The method of claim 28 wherein the first substrate comprises foam and the second substrate comprises plastic.

30. The method of claim 28 wherein the first substrate comprises foam and the second substrate comprises polyester.

* * * * *

UNITED STATES PATENT AND TRADEMARK OFFICE
CERTIFICATE OF CORRECTION

PATENT NO. : 6,392,545 B2
DATED : May 21, 2002
INVENTOR(S) : Rickie C. Lake et al.

It is certified that error appears in the above-identified patent and that said Letters Patent is hereby corrected as shown below:

Column 3,
Line 19, replace "damage. the insulative protective" with -- damage. The insluative protective --

Column 7,
Line 24, replace "a second portion. 210 of a termite" with -- a second portion 210 of a termite --
Line 35, replace "In other embodiments (not." with -- In other embodiments (not --

Signed and Sealed this

Thirty-first Day of December, 2002

JAMES E. ROGAN
*Director of the United States Patent and Trademark Office*